(12) United States Patent
Glazner

(10) Patent No.: US 7,506,990 B2
(45) Date of Patent: Mar. 24, 2009

(54) SWITCHPLATE AREA LIGHT

(75) Inventor: Gregory F Glazner, Littleton, CO (US)

(73) Assignee: Nite Ize, Inc., Boulder, CO (US)

( * ) Notice: Subject to any disclaimer, the term of this patent is extended or adjusted under 35 U.S.C. 154(b) by 84 days.

(21) Appl. No.: 11/279,904

(22) Filed: Apr. 17, 2006

(65) Prior Publication Data

US 2007/0171625 A1   Jul. 26, 2007

Related U.S. Application Data

(60) Provisional application No. 60/760,626, filed on Jan. 21, 2006.

(51) Int. Cl.
*F21V 33/04*   (2006.01)
(52) U.S. Cl. .................. 362/95; 362/276; 362/800; 315/51; 200/317
(58) Field of Classification Search ................. 362/95, 362/276, 800, 802; 200/310, 312, 317; 315/129, 315/133, 51, 56, 74, 75; 340/640, 656
See application file for complete search history.

(56) References Cited

U.S. PATENT DOCUMENTS

| | | | | |
|---|---|---|---|---|
| 2,023,819 | A * | 12/1935 | Pavelka | 200/312 |
| 4,000,405 | A * | 12/1976 | Horwinski | 362/95 |
| 4,340,826 | A | 7/1982 | Muchnick | |
| 4,514,789 | A | 4/1985 | Jester | |
| 4,755,913 | A | 7/1988 | Sleveland | |
| 5,473,517 | A * | 12/1995 | Blackman | 362/95 |
| 5,660,459 | A | 8/1997 | Appelberg | |
| 5,833,350 | A * | 11/1998 | Moreland | 362/95 |
| 6,010,228 | A * | 1/2000 | Blackman et al. | 362/95 |
| 6,350,039 | B1 * | 2/2002 | Lee | 362/95 |
| 6,423,900 | B1 | 7/2002 | Soules | |
| 6,431,719 | B1 * | 8/2002 | Lau et al. | 362/95 |
| 6,547,411 | B1 | 4/2003 | Dornbusch | |
| 6,561,677 | B1 | 5/2003 | Leen | |
| 6,648,496 | B1 | 11/2003 | Elghoroury | |
| 6,805,469 | B1 | 10/2004 | Barton | |
| 6,808,283 | B2 * | 10/2004 | Tsao | 362/95 |
| 6,883,927 | B2 | 4/2005 | Cunningham | |
| 6,943,296 | B2 * | 9/2005 | Perrella et al. | 174/66 |
| 6,965,205 | B2 | 11/2005 | Piepgras | |
| 2004/0246704 | A1 | 12/2004 | Burdick | |
| 2005/0259416 | A1 | 11/2005 | Gauna | |
| 2005/0285547 | A1 | 12/2005 | Piepgras | |

* cited by examiner

*Primary Examiner*—Sandra L. O'Shea
*Assistant Examiner*—Gunyoung T. Lee
(74) *Attorney, Agent, or Firm*—Patton Boggs LLP

(57) ABSTRACT

A light emitting diode (LED) and associated driver circuit wherein the LED is mounted on the front of a switchplate and the driver circuit on the back of the switchplate. The LED is mounted at a downward angle on the outside of the switchplate so as to light a pathway beneath the switchplate. The drive electronics are designed to work with a return path through an electrical load. Additionally, the LED driver circuit is designed to allow operation of the LED with both resistive and reactive loads controlled by the switch to which the switchplate is connected. The device is also designed to be connected to any electrically valid combination of 2-way, 3-way, and 4-way switches either singly or in combination.

17 Claims, 6 Drawing Sheets

SWITCHPLATE AREA LIGHT

CROSS-REFERENCE TO RELATED APPLICATIONS

This application claims the benefit of provisional patent application Ser. No. 60/760,626 filed 2006 Jan. 21 by the present inventor.

FEDERALLY SPONSORED RESEARCH

Not Applicable

SEQUENCE LISTING OR PROGRAM

Not Applicable

BACKGROUND OF THE INVENTION

1. Field of Invention

This invention relates to alternating current powered night lights, specifically to such night lights where the load controlled by a switch or switches is used as the electrical return path.

2. Prior Art

There are many night lights on the market in this crowded field of art. However, few provide a return path for current used to power a light through a load controlled by a switch. Most current night lights plug into an existing outlet receptacle and light a small area with a low level of light. U.S. Pat. No. 6,561,677 (2003) by Leen is one example. Others are wired into an outlet box. U.S. Pat. No. 6,547,411 B1 (2003) by Dornbusch is typical of such night lights. In such cases, power for the night light is not an issue because an electrical return path through a neutral wire is available.

In permanently mounted switchplate installations, prior inventors have generally assumed that a neutral wire was available in the outlet box. For purposes of this application, permanently mounted means connected directly to the building wiring, not a plug-in device. A neutral wire is always available in electrical boxes containing outlet receptacles. Unfortunately, many times light is needed where no neutral wire is available. This is commonly the case in electrical boxes containing only a switch or switches. The neutral wire typically resides in the electrical box serving the load, far from the box containing the switch that controls the load. A night light can be made to work in such a situation only if the return path is through the load.

There are a few examples of prior art that deal with this situation, however as will become clear in the ensuing discussion, they all have shortcomings that are addressed by the current invention.

Indicator lights that derive a return path for electrical current through a load are not unknown, but they are used as toggle or rocker switch illuminators. The illumination is for the immediate area of the switchplate surrounding such toggles or rockers. Generally, a very low wattage neon bulb is used for such purposes. For all practical purposes, no useable area lighting is furnished by such an arrangement, nor is any intended. The indicator lights serve only to make the switch easier to find in the dark. U.S. Pat. No. 4,755,913 (1988) by Steveland uses a light emitting diode (LED) as an indicator light. The light in this case serves the same purpose as prior neon lights. It marks the location of the switch in the dark. Steveland specifies a red or green LED.

Some prior inventions have used light emitting diodes, in theory, drawing current through a load to furnish more usable lighting, but all have issues that are resolved by the present invention. U.S. Pat. No. 6,883,927 B2 (2005) by Cunningham et al shows a five LED array connected to a controller through specific circuitry. Because of the relatively large current drain required from five LEDs, a current return path through the neutral wire and not the load is required. This is shown in Cunningham's FIG. 4. where both line and neutral connections are shown. This requires the presence of a neutral wire in the switch box. In addition, Cunningham's specification states that the LEDs will stay on continuously regardless of the position of the switch. This can only be the case if the circuit is powered independently and not through the load as the position of the connection wires from the controlling electronics to the switch terminals on Cunningham's FIG. 12 would appear to indicate. In addition, the Cunningham invention requires a frame to house the LED assembly necessitating a significant protrusion from the wall as well as additional manufacturing cost.

U.S. Pat. No. 6,805,469 B1 (2004) by Barton specifies an LED safety device using the toggle handle of a switch as the housing for the LED. It is primarily intended as an emergency device using a battery backup located in the outlet box. Electronics are needed to charge the battery. In addition the device will only work with a conventional toggle. Many light switches today are of the rocker type and Barton's invention would not work well with these. Barton's device also has several other disadvantages. From Barton's FIG. 1B, 2B, and 3, the electronics require a neutral return line, labeled as such on Barton's drawings. As stated previously, neutral lines are rarely present in switch boxes. In addition, according to Barton's FIG. 2A, the electronics and battery package appear to take a significant amount of room in the outlet box. Many outlet boxes are crowded with wires. Finally the toggle in the downward position would direct the light from the LED too far out from the wall on which the switch is mounted to serve as pathway illumination.

U.S. Pat. No. 6,648,496 B1 (2003) by Elghoroury et al specifies an array of LEDs around the periphery of an assembly which covers an existing switchplate. Each LED includes an optical assembly, for example a reflector and a lens to disperse light. Other than a variable resistor shown on his FIG. 1, there appear to be no other electronic components present to drive the LEDs and no connection to the electrical wiring is shown. In addition, the provided drawings indicate light emission directly toward the user. This is acceptable as an indicator light for switch location, but provides no useable pathway lighting. Elghoroury's design appears to cover an existing switchplate with a larger device and so cannot be used in areas where the existing switchplate is the largest size cover that will work in the available space. As with previous patents cited, there is a power issue with the preferred embodiment of four LEDs.

U.S. Pat. No. 6,965,205 B2 (2005) by Piepgras et al, along with related CIPs, and patent applications show LEDs mounted behind the switchplate on their FIG. 36 with a flat mounted lens directing the light toward the user. This will provide no useable pathway lighting under the switchplate although it will work as an indicator light. Also a plurality of LEDs is specified. The present invention uses only one for reasons that will be clear in the ensuing narrative.

Almost all directly wired night lights in the prior art make use of multiple LED arrays. If several of these devices were installed on multiple 3-way and 4-way switches controlling the same load, the probability of activating the load is much greater. Thus, for example, if the five LED array in the preferred embodiment of Cunningham's device were to be used on two 3-way switches, one at the top and one at the bottom of a stairway, the current draw from 10 LEDs plus associated electronics would have a much greater likelihood of activating the load. The situation would be exacerbated if there were one or more 4-way switches in the circuit that made use of Cunningham's device.

Multiple LED night lights are neither necessary nor desirable for the following reasons: (a) White light LEDs generally are very efficient and provide a large amount of light for a given amount of current. (b) Having an excessive amount of light emanating from the LED has a detrimental effect on night vision. One needs an adequate amount of light to see the pathway beneath the switch clearly, but no more. (c) Additional LEDs require additional current and thus there is more heat generated by the electronics to dissipate behind the switchplate. (d) White LEDs are a relatively expensive component compared to the other electronic parts in the LED drive circuitry. The use of one LED allows the device to be produced more economically.

In addition, prior art also does not appear to have considered the problem of reactive loads. Because the load functions as a return path for electrical current in this invention, it is important to be able to pass current through the load without a significant amount of impedance as this will dim the light produced by the LED and may also cause a significant amount of LED flickering. If the load is incandescent, it is mostly resistive and most any LED driver circuit that functions from an alternating current supply will work provided it does not draw enough current to activate the load. Today, many incandescent light bulbs are being replaced by their compact fluorescent equivalents because of their greater efficiency and energy savings. These use an electronic ballast and so present a more reactive load to the LED driver circuitry. It is also possible that the device will be connected to a long tube fluorescent load. In this case, either a magnetic or electronic ballast will be used thus again presenting a more reactive load to the LED driver circuitry. The present invention addresses these issues by introducing a current regulator connected in a non-standard way into the circuitry to reduce these fluctuations.

3. Objects and Advantages

Several objects of the present invention are:

(a) To make use of efficiencies in the utilization of light emitted by mounting the LED in a configuration not anticipated by the manufacturer.

(b) To provide area lighting where no neutral electrical return line is available.

(c) To address the problem of reactive loads where the return path for the night light is through a fixture containing compact fluorescent or long tube fluorescent bulbs.

The present invention offers a number of advantages over the prior art:

(a) The invention provides usable pathway lighting in areas where a conventional plug-in night light is unusable due to lack of an electrical socket.

(b) The LED is mounted on the outside of the switchplate and is oriented in such a way as to make full use of its light output without the use of any separate intervening optical elements such as reflectors, lenses or diffusers.

(c) The LED is deliberately driven below its rated input, resulting in extremely long life. The LED and associated circuitry should last the life of the structure in which it is installed. The light output is nonetheless sufficient for adequate nighttime pathway lighting.

(d) Because the current draw is low, multiple devices may be connected to the same electrical circuit controlling the same load. This is typically the case with 3-way and 4-way switch installations.

(e) Because the LED and associated electronics are built onto the switchplate, no light is necessary on the rocker or toggle switch itself. The invention thus serves the dual purpose of providing useful area lighting and serving as a locator for the switch toggle or rocker.

(f) The majority of the light from the LED is directed away from the user and onto the floor thus helping to preserve night vision.

(g) Because light switches are typically mounted several feet higher on the wall than electrical outlets, light from the LED illuminates a much larger area than typical plug-in night lights.

(h) The invention is designed to operate without modification with 2-way (SPST), 3-way, and 4-way light switches or any valid combination thereof. The only stipulation is that the switch design (toggle or rocker) be consistent with that of the switchplate. Thus there are two substantive embodiments of the invention, one for each style of switchplate in common use. These are the toggle type and rocker type.

(i) The invention is extremely low-profile with the light emitting portion protruding less than 5 mm from the surface of the switchplate.

(j) The invention draws very little current due to simple high-efficiency circuitry and the use of a single white light LED.

(k) The design eliminates many of the parts described in prior art. It requires no protruding frame, no separate electronics box unattached to the switchplate, no structure to hold an array of LEDs, and very few electronic parts. In addition, no focusing or diffusing lenses are required to direct and spread the light produced by the LED. This makes for efficient use of the available light.

(l) The device electronics mitigate the effect of reactive loads such as those encountered with long tube or compact fluorescent bulbs by regulating the current driving the LED.

(m) The state of the night light when the load is turned off provides an indication of the state of the load. If the night light is not illuminated when the switch is off, there may be a problem with the load.

SUMMARY

In accordance with the present invention, an LED is mounted on the outside of a switchplate and oriented in such a way as to provide pathway lighting without the use of any intervening reflectors, lenses or diffusers. Because the device is configured as a modified switchplate, it can be installed on any switch designed to fit the switchplate whether it is a 2-way, 3-way or 4-way switch. The design is such that multiple devices can be installed on the same circuit controlling the same load. The associated electronics are simple with a low and inexpensive component count. In addition, the electronics will work with reactive loads such as those found in compact and long tube fluorescent fixtures.

DRAWINGS—FIGURES

In the drawings, closely related figures have the same number but different alphabetic suffixes.

DRAWINGS—REFERENCE NUMERALS

Figure 1A:
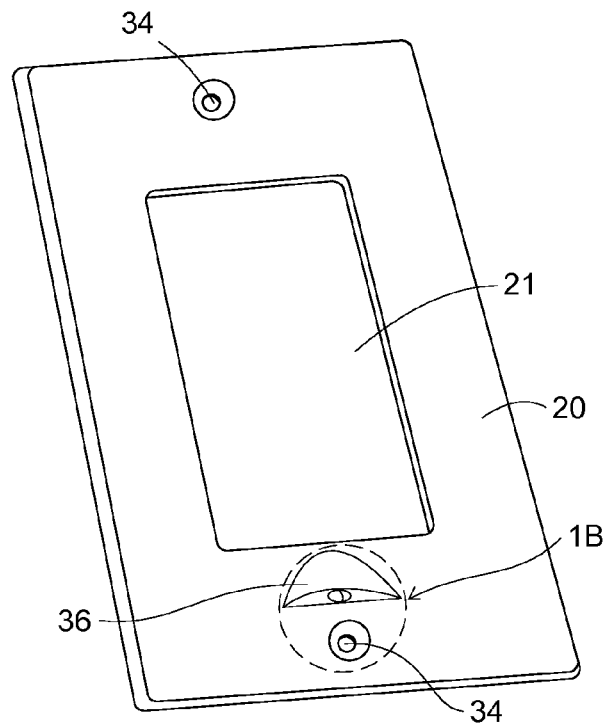
FIG. 1A shows a front perspective view of a rocker type switchplate with mounted LED area light.
Figure 1B:
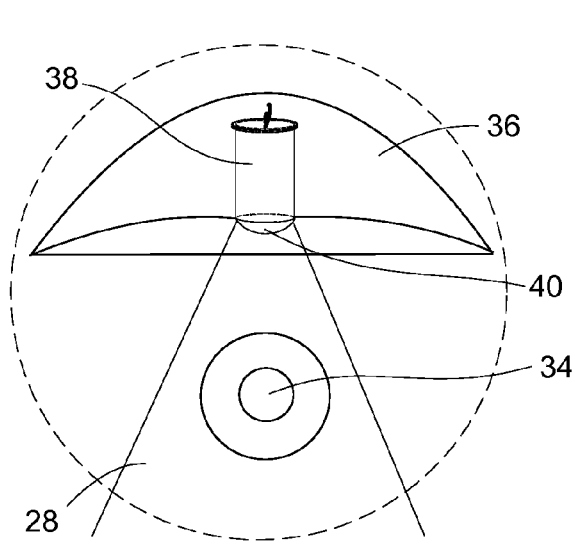
FIG. 1B shows an expanded front view of the mounting for the LED.
Figure 1C:
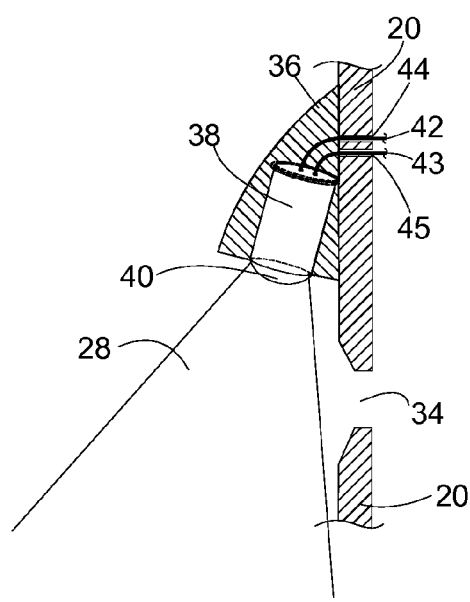
FIG. 1C shows an expanded sectional side view of the LED mounting.

- 20 rocker type switchplate
- 21 hole for protrusion of rocker type switch
- 28 light rays emanating from LED
- 34 hole for mounting screw in rocker type switchplate
- 36 LED housing
- 38 LED
- 40 built-in lens portion of LED
- 42 anode wire from LED
- 43 cathode wire from LED
- 44 hole through rocker type switchplate for anode wire of LED
- 45 hole through rocker type switchplate for cathode wire of LED
- 46 toggle type switchplate
- 48 hole for mounting screw in toggle type switchplate
- 50 hole for protrusion of toggle type switch
- 54 hole through toggle switchplate for anode wire of LED
- 55 hole through toggle switchplate for cathode wire of LED
- 60 LED driver circuit assembly
- 61 connection wire 1 from LED driver circuit assembly
- 62 connection wire 2 from LED driver circuit assembly
- 64 2-way switch
- 65 2-way switch terminal
- 66 2-way switch terminal
- 67 wire from line
- 68 wire to load
- 70 first 3-way switch in circuit
- 72 second 3-way switch in circuit
- 74 first traveler wire between switches
- 76 second traveler wire between switches
- 78 terminal of 3-way switch for connection to line
- 80 terminal of 3-way switch for connection to load
- 82 connection of LED driver assembly to terminal on switch connected to first traveler wire for the 3-way switch connected to line
- 84 connection of LED driver assembly to terminal on switch connected to second traveler wire for the 3-way switch connected to load
- 86 connection of LED driver assembly to terminal on switch connected to first traveler wire for the 3-way switch connected to line
- 88 connection of LED driver assembly to terminal on switch connected to second traveler wire for the 3-way switch connected to load
- 90 first 3-way switch in circuit utilizing a 4-way switch
- 92 second 3-way switch in circuit utilizing a 4-way switch
- 94 4-way switch
- 96 terminal of 3-way switch for connection to line
- 98 terminal of 3-way switch for connection to load
- 100 first traveler wire between 3-way switch connected to line and 4-way switch
- 102 second traveler wire between 3-way switch connected to line and 4-way switch
- 104 first traveler wire between 3-way switch connected to load and 4-way switch
- 106 second traveler wire between 3-way switch connected to load and 4-way switch
- 108 connection of LED driver assembly to first traveler wire terminal of 3-way connected to line
- 110 connection of LED driver assembly to second traveler wire terminal of 3-way connected to line
- 112 connection of LED driver assembly to first 4-way switch terminal on load side of switch
- 114 connection of LED driver assembly to second 4-way switch terminal on load side of switch
- 116 connection of LED driver assembly to first traveler wire terminal of 3-way switch connected to load
- 118 connection of LED driver assembly to second traveler wire terminal of 3-way switch connected to load
- 120 connection of LED driver assembly to first 4-way switch terminal on line side of switch
- 122 connection of LED driver assembly to second 4-way switch terminal on line side of switch
- 220 rocker type switchplate with opening for ambient light sensor
- 221 rocker type switchplate with opening for manually operated switch
- 222 ambient light sensor
- 252 manually operated switch to turn off LED

DETAILED DESCRIPTION—FIGS. 1A, 1B, 1C, AND 3A-PREFERRED EMBODIMENT

Figure 3A:
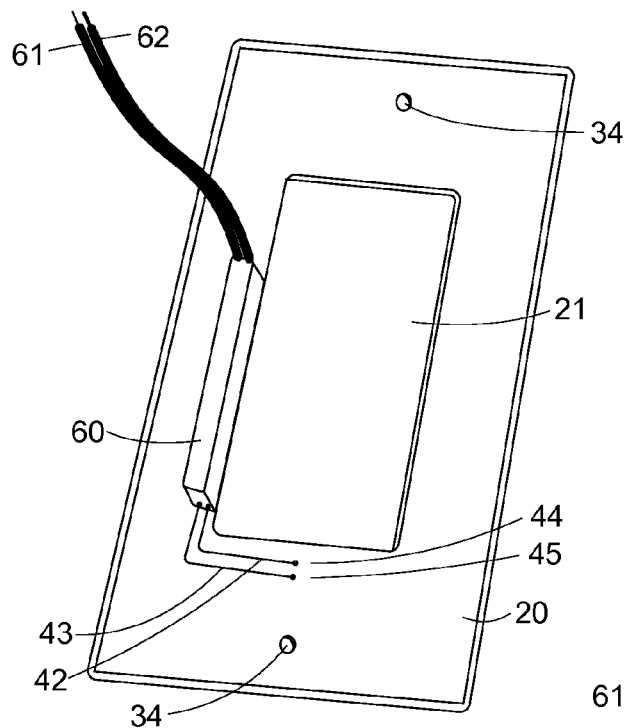
FIG. 3A shows a back perspective view of the rocker switchplate in FIG. 1A showing the mounting of the LED driver circuit assembly.
Figure 3B:
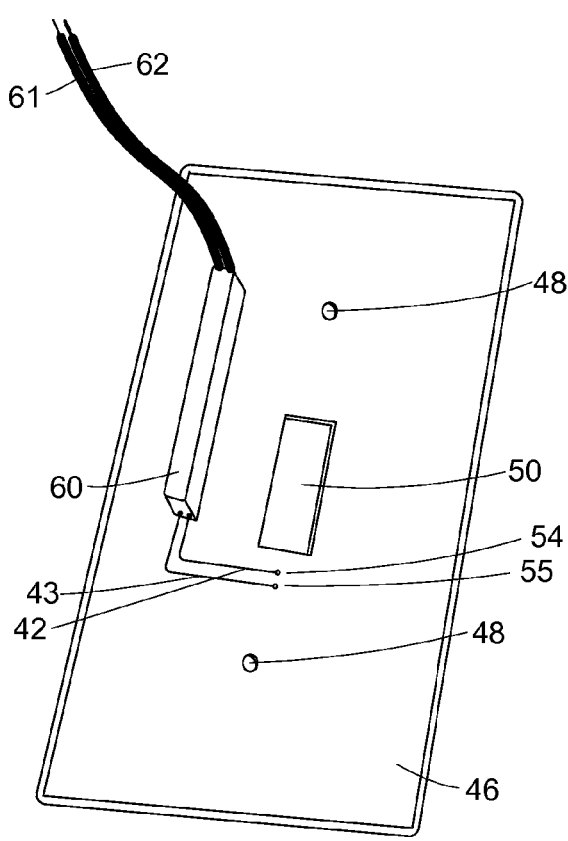
FIG. 3B shows a back perspective view of the toggle switchplate in FIG. 2A showing the mounting of the LED driver circuit assembly.

The preferred embodiment of the present invention is illustrated from the front in FIG. 1A and back in FIG. 3A. A cylindrical LED 38 is molded or fitted into a housing 36 on the structure of the switchplate 20 at such an angle that the light rays 28 emanating from the LED 38 provide illumination on the pathway below the switchplate. Other than the leads 42 and 43 exiting the LED 38 which protrude though holes 44 and 45 in the switchplate 20, the LED 38 is mounted entirely on the front of the switchplate 20. The housing 36 surrounding the LED 38 is of such a composition that it allows some light to escape. Alternatively, the switchplate 20 itself may be modified to provide an enclosure for the LED 38 that angles it away from the plane of the switchplate in the same manner as with a separate housing 36. The built-in lens 40 molded into the end of the LED 38 protrudes from the housing 36 and is not covered by the housing.

The LED driver circuit 60 is potted onto the back of the switchplate 20. The LED driver circuit 60 is connected to the LED 38 through small holes 44 and 45 in the switchplate 20. This provides a durable, inexpensive structure for both the light source and driving electronics. The LED driver circuit assembly 60 is kept sufficiently thin so as to be able to slip between the body of the existing switch and the side of the electric box. The electrical switch rocker protrudes through opening 21. The switchplate 20 is secured in place by means of screws through mounting holes 34.

Figure 6:
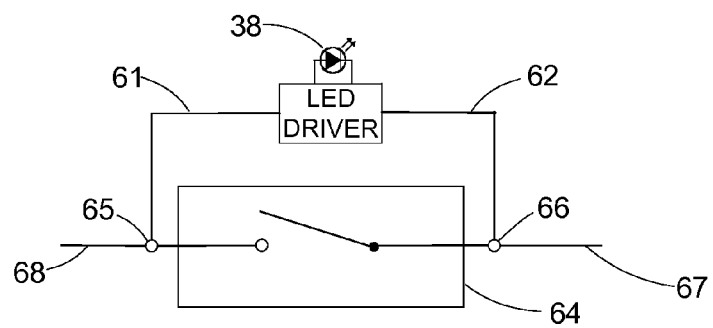
FIG. 6 shows how the invention would be connected to a 2-way switch.
Figure 7:
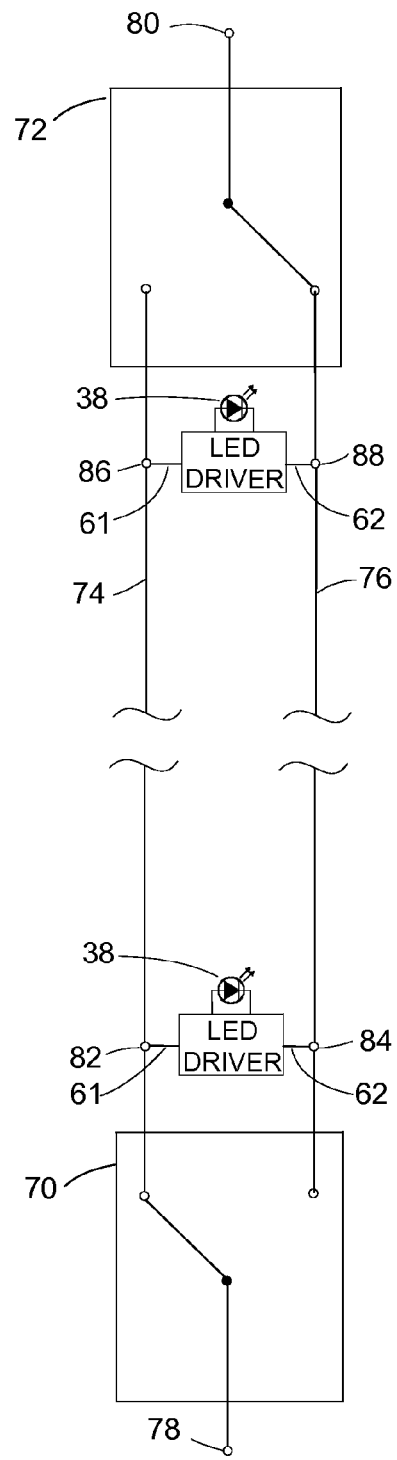
FIG. 7 shows how multiple devices would be connected to a set of 3-way switches.
Figure 8:
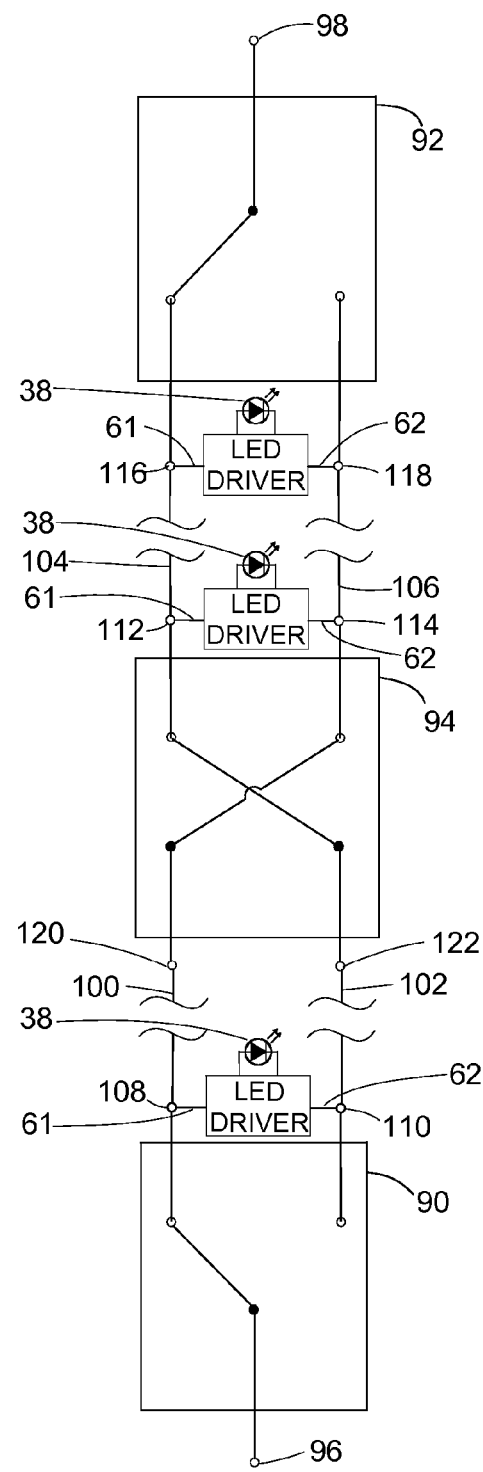
FIG. 8 shows how multiple devices would be connected to a set of 3-way and 4-way switches.

Two wires 61 and 62 emanate from the LED driver circuit assembly 60. These are used to connect the device to the terminals of a 2-way 64, 3-way 70, 72, 90, and 92 or 4-way 94 switch as shown in FIGS. 6, 7, and 8 respectively.

Figure 4:
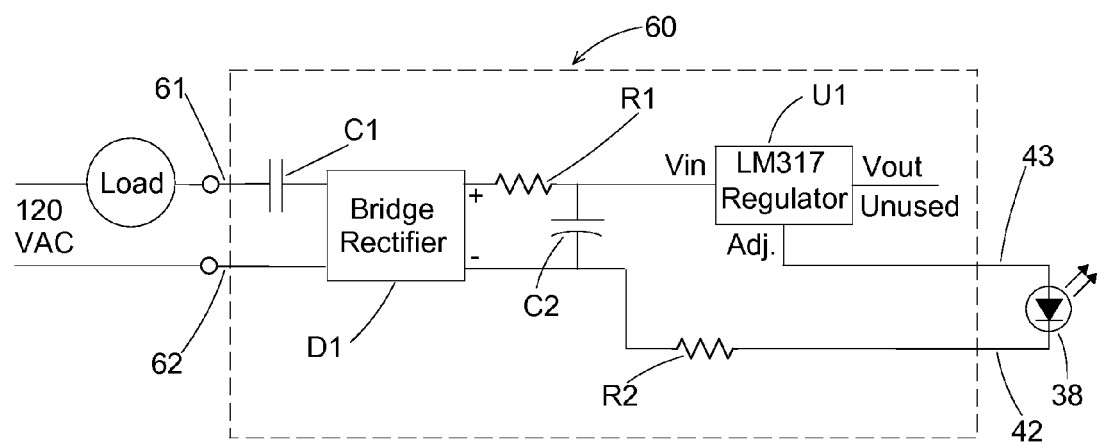
FIG. 4 shows a schematic representation of the LED driver circuitry.
Figure 5:
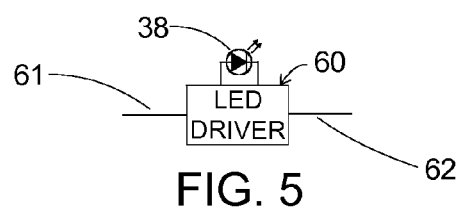
FIG. 5 shows a block diagram representation of the circuit shown in FIG. 4.

The LED driver circuit 60 diagrammed in FIG. 4 and reduced to block form in FIG. 5 consists of a bridge regulator D1 rated at 1A, for example a Rectron RS104, an adjustable regulator U1, typically an LM317 or equivalent 3-terminal integrated circuit regulator of which only two terminals are used. Capacitors C1 (0.1 uF, 250v, non-polarized), and C2 (47 uF, 50v polarized), and resistors R1 (4.7K ohms, ¼ w), and R2 (180 ohms, ¼ w) complete the components necessary to drive the LED 38. The specific values of the components depend on the electrical characteristics of the LED 38 driven and to the extent of current supplied to the LED 38. This current is typically below the rated maximum for the LED 38.

In operation, the capacitor C1 serves to allow only a part of the alternating current cycle to enter the remainder of the circuit before it becomes fully charged, thus reducing the amount of current that must be dissipated by resistor R1 after rectification by bridge D1. Capacitor C2 serves to filter the output from bridge D1 through resistor R1 before it reaches regulator U1. U1 is configured as a constant current source to mitigate the effect of reactive loads such as compact fluorescent bulbs and long tube fluorescent fixtures. Although this is a 3-terminal device, only two of the pins are used—Pin 3 (input) and Pin 1 (adjust). This is a way of using this component in a circuit not anticipated by the manufacturers. It makes use of the internal current limiting circuitry built into the device. The low currents involved with this circuit allow the use of the LM317 regulator U1 in this manner. Resistor R2 further limits current to the LED 38.

Various fluorescent lighting fixture manufacturers use different, sometimes proprietary circuits in their ballasts. These can cause substantial fluctuations in the current passed through them. This can result in brightening and dimming of LED 38 output without effective current regulation. Because the LM317 regulator U1 is produced in high volume, it is very inexpensive and can replace other current regulating devices.

Many other circuit arrangements and component values could be used to drive the LED 38 through an electrical load. The circuit shown in FIG. 4 is one such circuit that will work for this purpose.

In an application where electronic components are placed inside an electrical box, it is important to minimize generated heat. The LED driver circuit 60 shown in FIG. 4 generates very little heat. This is important from a safety standpoint.

The most important feature of the invention is the efficient use of light emitted by the LED 38. This invention is unique in the fact that the LED 38 is mounted in an unusual fashion. Cylindrical LEDs are manufactured to be used in through-hole and base flush configurations. This invention uses neither. The LED 38 is mounted such that its longitudinal axis is almost parallel with the face of the switchplate 20. The placement of the light source is entirely on the outside of the switchplate 20. Because all cylindrical LEDs have some internal reflection and therefore some light leakage around their periphery, this is also put to use by the placement of the LED 38 on the outside of the switchplate 20. This unavoidable light leakage is not wasted but used as an indicator of switch location provided the housing 36 of the LED 38 is made with a material that allows some light to pass.

The invention features a very low profile on the wall. Most plastic or nylon switchplates protrude approximately 5 mm from the wall. This LED 38 placement adds only approximately another 5 mm which is about the same protrusion amount of a rocker switch installed behind the switchplate and is much less than the protrusion of a toggle switch.

Another feature of the invention is the use of a standard size switchplate 20 to carry the LED driver circuit 60. Because it is not unusual for outlet boxes to be installed close to door jambs or other trim, the invention takes up no more lateral space than the switchplate it replaces and thus can be used as a switchplate replacement in almost any location.

OPERATION—PREFERRED EMBODIMENT

There are three types of light switches in common household use: 2-way (SPST) 64, 3-way (SPDT) 70, 72, 90, and 92, and 4-way (DPDT with cross-connect) 94. This invention may be connected to any of these in any electrically valid combination. In addition, multiple devices may be connected to the same lighting circuit to control a specific load. Referring to FIGS. 7 and 8, it is important to note that not all devices shown need to be connected. One is sufficient, but the design allows for devices to be installed on any switch in the circuit. The method of accomplishing this will be explained below. In all cases, when the load is off, current will flow though the LED driver circuit 60 and the LED 38 will be illuminated. When the load is on, no current will flow through the device and the LED 38 will be off.

Note that in general, as long as the two wires 61 and 62 to the LED driver circuit 60 are connected across traveler wires between switches, the invention will work properly. This is because when the load is off, one traveler wire is connected to the line side of a circuit and the other is connected to the load. This provides a return path for the current utilized by the invention because the load is connected to a neutral wire. Detailed electrical connection descriptions for specific switch configurations follow.

Connection to a 2-way (single pole, single throw—SPST) switch. Referring to FIG. 6, the wires 61 and 62 emanating from the LED driver circuit 60 are connected to each of the two terminals 65 and 66 of 2-way switch 64. It is irrelevant which wire is connected to which terminal. When the switch is open, current flows from the line side 67 of the switch through the LED driver circuit 60 to the load side 68 of the open switch. Since this side of the switch is connected to the load, there is now a return path for the current and the LED 38 will be illuminated. When the switch is closed, current flows from the line side 67 of the switch to the load side 68 of the switch and the load is energized. No current flows through the LED driver circuit 60, and the LED 38 is not illuminated.

Connection to a 3-way (single pole, double throw—SPDT) switch. Referring to FIG. 7, the wires 61 and 62 emanating from the LED driver circuit 60 are connected to terminals 82 and 84 or 86 and 88 feeding the "traveler" wires 74 and 76 between the two 3-way switches 70 and 72 in the lighting circuit. 3-way switches are designed to be used in pairs such that the load may be turned on or off from either switch. Only one of the traveler wires 74 and 76 will be energized at a time depending on the state of the switch 70 connected to the line side 78 of the circuit. The other 3-way switch 72 in the circuit can then energize or not energize the load depending on its position relative to the traveler wires 74 and 76. If it is closed with respect to the energized wire 74, the load will be on. If it is open with respect to the energized traveler wire 74 the load will be off. Because the LED driver circuit 60 is connected between the two traveler wires 74 and 76, one of the wires will always be energized. If the load is off, then current can flow from the traveler wire 74 currently connected to the line through the LED driver circuit 60 via switch terminal 82 or 84 to the other traveler wire 76 via switch terminal 84. This wire is connected through the other 3-way switch 72 to the load 80 and thus a circuit is completed and the LED 38 will be illuminated. When the load 80 is on, no current will flow through the LED driver circuit 60 and the LED will be off. Note that devices may be connected to either or both of the 3-way switches 70 and 72 in the circuit. If a second device is installed, it would be connected between terminals 86 and 88 as shown in FIG. 7. This is particularly useful when it is desired to light both the top and bottom of a stairway at the same time. Note that if two devices are installed, they are connected in parallel.

Connection to a 4-way (double pole, switched cross-connected—DPDT) switch. Operation of the present invention in a circuit containing a 4-way switch is similar to operation in a circuit containing only 3-way switches. 4-way switches are designed to be installed between a pair of 3-way switches and any number of 4-way switches can be used in a circuit controlling the same load. As in the 3-way case, all LED devices are connected in a parallel fashion. FIG. 8 shows a circuit where three switches 90, 92, and 94 control the same load. Referring to FIG. 8, the connection wires 61 and 62 to the LED driver circuit 60 may be connected to either side of the 4-way switch 94 via terminals 112 and 114 or 120 and 122 for proper operation. A 4-way switch 94 is a switched cross-connection device. When the toggle or rocker is in one position, the switch functions as a straight-through device. For each of the two traveler wires 100 and 102 in this case, the switch functions as a pass-through device to the traveler wires 104 and 106. That is, traveler wire 100 would be connected to traveler wire 104 and traveler wire 102 would be connected to traveler wire 106. In the other toggle position of the switch 94 as shown in FIG. 8, traveler wire 100 is connected to traveler wire 106 and traveler wire 102 is connected to traveler wire 104. This has the same electrical effect of changing the position of the toggle on the load side 98 of the circuit. Detailed operation is as follows: 3-way switch 90 is connected to the line side 96 of a circuit. This energizes traveler wire 100 and also 3-way switch 90 terminal 108 to which the LED driver circuit 60 is connected. The energized traveler wire 100 reaches 4-way switch 94 at its terminal 120. Since the switch 94 toggle is in the cross connected position in FIG. 8, current flows through the switch to terminal 114 where another LED driver circuit 60 is connected. Traveler wire 106 is also energized because it is connected to 4-way switch 94 terminal 114. 3-way switch 92 is connected to the load through its terminal 98. Due to its toggle position shown in FIG. 8, traveler wire 104 is now also connected to the load through 3-way switch 92 terminal 116. As a result the driver electronics will be energized and the LED 38 will light. Because traveler wire 104 is connected to terminal 112 on 4-way switch 94, a circuit is completed through the LED driver 60 connected to terminal 112 and the LED 38 will light. Due to the position of the switch toggle for 4-way switch 94, terminal 122 and traveler wire 102 are also connected to the load. The LED driver circuit connected to 3-way switch 90 terminal 110 thus is also connected to the load and the LED 38 will be illuminated. Note that for the 4-way switch 94 devices can be connected across either terminals 112 and 114 or 120 and 122.

DESCRIPTION—ALTERNATIVE EMBODIMENT

Figure 2A:
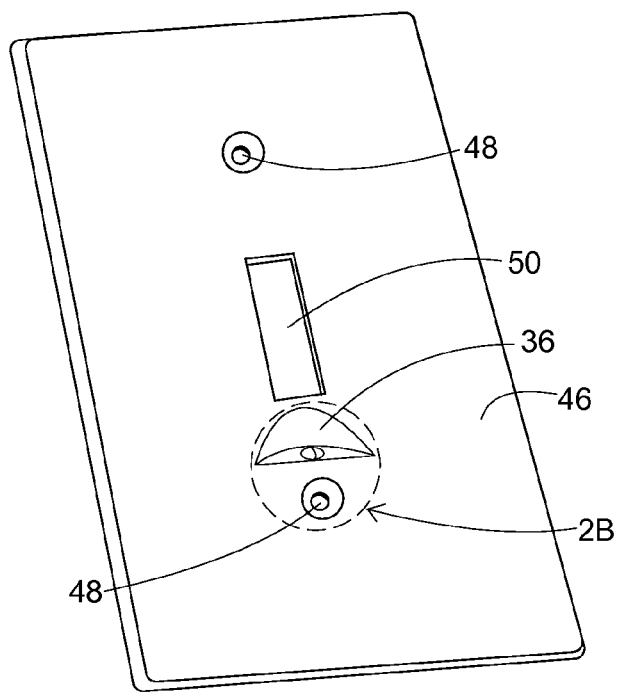
FIG. 2A shows an front perspective view of a toggle type switchplate with mounted LED area light.
Figure 2B:
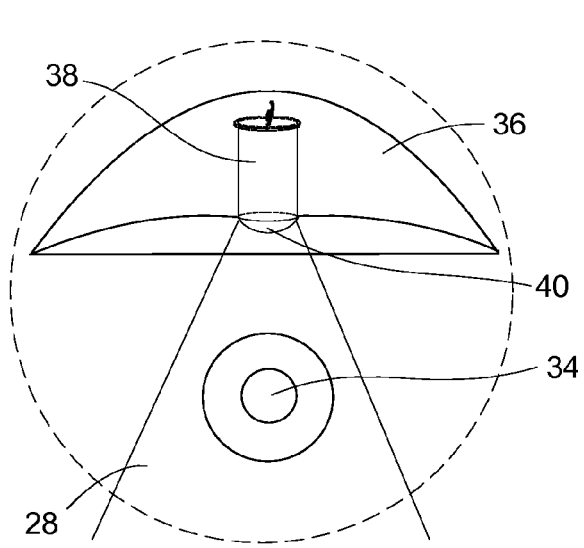
FIG. 2B shows an expanded front view of the mounting for the LED.
Figure 2C:
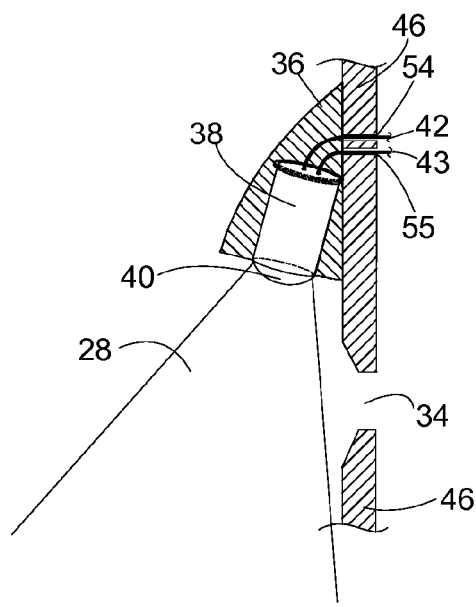
FIG. 2C shows an expanded sectional side view of the same LED mounting.

An alternative embodiment of this invention is the use of a toggle type switchplate 46 as in FIG. 2A rather than a rocker type 20 as in FIG. 1A. The toggle of the switch behind the switchplate protrudes through an appropriately sized opening 50. The LED housing 36 and LED driver circuit assembly 60 must be placed in a different area of the switchplate due to the position of the toggle switch mechanism behind the switchplate. Thus the position of the holes 54 and 55 for routing the LED leads from the front to the back of the switchplate are in a different location than for a rocker type switchplate. The switchplate is secured in place by screws through mounting holes 48. All electronics as in FIG. 4 and connections to a lighting circuit through wires 61 and 62 remain the same.

DESCRIPTION—ADDITIONAL ALTERNATIVE EMBODIMENTS

The alternative embodiments discussed below can be used singly or combined in any valid combination.

Figure 9:
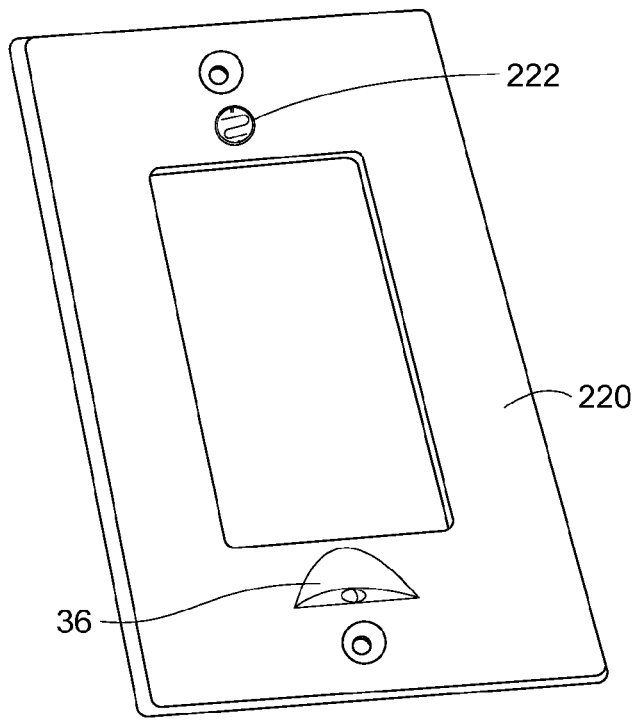
FIG. 9 shows an alternative embodiment of the invention incorporating an ambient light sensor.

(a) Although the electronics are very efficient, it is recognized that consumers may not want the LED 38 to be on during higher ambient light conditions. Accordingly, a photoresistor or phototransistor and associated additional circuitry can be incorporated into the design to turn off the LED 38 in higher ambient light conditions. The photosensitive element 222 would be mounted on the side of a switchplate 220 opposite the LED housing 36 with wiring on the back of the switchplate connecting to the drive electronics as shown in FIG. 9. Because, as shown previously, multiple devices in a circuit are electrically connected in parallel, they would operate independently turning on and off the LED 38 in response to ambient light conditions. This installation could be applied to either rocker or toggle switchplates.

Figure 10:
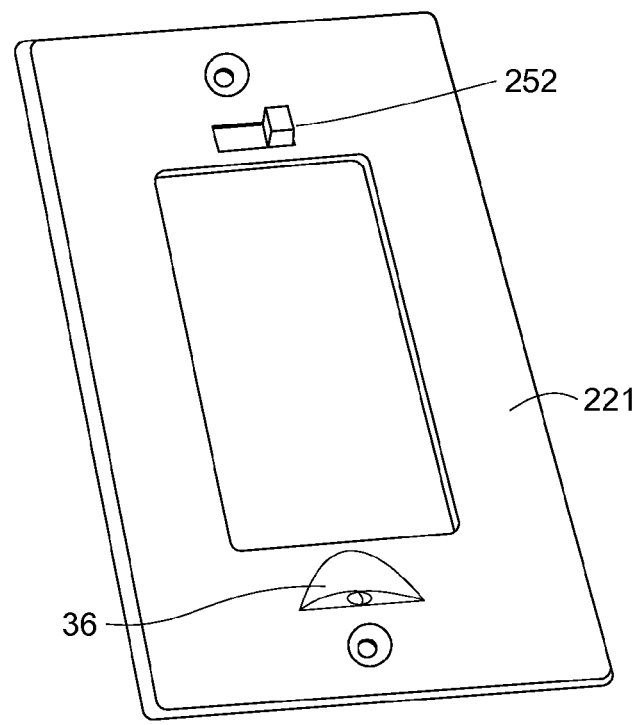
FIG. 10 shows an alternative embodiment of the invention incorporating a manually operated on-off switch.

(b) Because this is designed to be a wired-in installation, the LED 38 will remain on as long as power is applied and the load is turned off. Consumers may desire a way to independently turn off the LED 38. This can be accomplished with an additional switch 252 as shown in FIG. 10. Although the switch shown is a slide switch, any other on-off switch would work provided it will physically fit into the switchplate 221 and will not interfere with placement of other components. The switch would be wired into the drive electronics to control power to the LED 38. This switch could be installed in either rocker or toggle switchplates.

(c) Although most implementations of this invention will use a visible light LED, an alternative embodiment uses an infrared LED to illuminate an area. This would be useful in installations where security cameras are in use that can image an area illuminated with infrared light. This would be particularly useful in long hallways where the infrared illumination sources typically provided on a surveillance camera cannot reach the full length of an area effectively. In this case, it would make sense to orient the LED toward the ceiling by turning the switchplate 180 degrees to illuminate a larger area as the emitted infrared radiation would not pose a night vision issue and most security cameras are very sensitive to infrared light.

(d) Another embodiment would involve placing the LED 38 on the outside of a gang or combination switchplate.
(e) Switchplates typically are available in three standard sizes. The LED 38 could be placed on any of them, however the smallest standard size would be best as most switchplates are produced in this size will fit more installations than larger size switchplates.
(f) The device can be incorporated onto a blank switchplate. This would be useful in places where light is needed and a covered outlet box is available.
(g) Although the device is intended to be powered through a load, it will work equally well when a neutral wire is available. Thus the preferred embodiment will work without modification around a standard dual outlet. In this case, the light would generally not be emitted from as high a location on the wall, but useful light would still be provided without using any outlet space. For older outlets, the LED housing 36 and LED driver circuit 60 could be mounted on a switchplate with plug openings.
(h) To reduce the profile of the invention even more than in the preferred embodiment, part of the LED 38 may be machined down at an angle commensurate with the longitudinal axis of light emission so it may fit more closely to the switchplate. Both of these modifications would leave intact the angle the longitudinal axis of the LED 38 makes with the wall and thus the light rays 28 generated by the LED 38 would fall in the same place.
(i) Other possible embodiments could place the LED 38 on a location on the switchplate other than below the switch opening and above the switchplate mounting screw.
(j) LEDs are available in many sizes and shapes. Many types of LEDs other than the cylindrical type could be utilized including surface mount LEDs.
(k) A fusible link or equivalent electrical component could be incorporated in the electronics shown in FIG. 4. This component would be placed between and in series with lead 61 or 62 as an electrical safety device.

CONCLUSION, RAMIFICATIONS, AND SCOPE

The reader will see that this invention solves many of the problems associated with LED lighting through a load. It is important to realize that this type of lighting must be very efficient both in terms of use of light produced and electrical efficiency. To summarize, the main innovations here include:
(a) The provision for usable pathway lighting by powering the light source through an electrical load rather than a direct connection to a neutral line.
(b) The placement of the LED light emitting element entirely on the outside of the switchplate pointed downward at such an angle as to illuminate the path directly below the switchplate.
(c) No intervening optical elements between the LED light source and its application resulting in minimal light loss.
(d) The use of a very low profile design that minimizes protrusion from the wall.
(e) The recognition that the LED does not have to be driven at full rated power to provide adequate light at night. A night light can provide too much light, thus impairing night vision. Driving the LED at a lower power level also reduces heat generated by the drive electronics. More LEDs are not better when power must be routed through a load. One white light LED is sufficient to provide adequate pathway lighting.
(f) The recognition that consumers may use more than one of these devices on a single electrical circuit controlling a single load through multiple switches, for example 3-way switches at the top and bottom of a stairway and designing an electrically efficient circuit so as to not activate the load.
(g) The recognition that homeowners are using more efficient lighting such as compact fluorescent bulbs and long tube fluorescent fixtures as the cost of power increases. Thus the design includes a method of current regulation to the LED to counter the effects of reactive loads. Such method uses only the input terminal and the adjustment terminal of a positive three terminal voltage regulator. The output terminal is not used. This is not a standard manufacturer's configuration. Current regulation is accomplished with the internal constant current source circuitry of the regulator.

While the above description contains many specifics, these should not be construed as limitations on the scope of the invention, but as exemplifications of the presently preferred embodiments thereof. Many other modifications, improvements, and variations are possible and should be readily apparent to those skilled in the art.

Thus the scope of the invention should be determined by the appended claims and their legal equivalents, and not the examples given.

What is claimed is:
1. An area light for providing pathway lighting in darkened areas comprising:
   a body member consisting of a switchplate for use over one or more alternating current electrical switches or an outlet plate for use over one or more alternating current electrical outlets, wherein said switchplate has a back; and
   a light emitting diode (LED) mounted on said switchplate, said LED having a longitudinal axis along which light is primarily emitted, so that the longitudinal axis of light emitted from said light emitting diode illuminates the pathway directly beneath said switchplate or outlet plate; and
   a light emitting diode driver circuit to power said light emitting diode, said LED driver circuit mounted on the back of the switchplate or outlet plate, said LED driver circuit drawing electrical energy from said alternating current power source covered by said switch plate or outlet plate, wherein a return path for current through said light emitting diode is through an electrical load controlled by said electrical switch or outlet covered by said plate, and wherein the plate, LED, and LED driver circuit are configured to be mounted and installed without the removal of a switch or outlet upon which the switchplate is installed; and wherein said light emitting diode is molded in a protruding housing, having a downward facing opening on said switch or outlet plate.
2. The area light of claim 1, wherein said switch plate or outlet plate has one or more holes formed to receive lead wiring from said light emitting diode and the lead wires emanating from the light emitting diode are routed through said one or more holes in said switchplate or outlet plate.
3. The area light of claim 1, wherein the light emitting diode has a molded lens, further comprising a material to encase the light emitting diode up to the point of said molded lens such that said molded lens protrudes from said semiconical housing.
4. The area light of claim 1, wherein said light emitting diode driver circuit is housed in an elongated rectangular prism mounted on the back of the switchplate of claim 1 in such a manner as to be disposed to fit between the electrical switch and the side of an electrical outlet box into which the electrical switch is installed.

5. The area light of claim 1, further including an ambient light sensing component mounted on the front of the switchplate or outlet plate and associated wiring and modifications to the light emitting diode driver circuit are provided to turn off the light emitting diode when the ambient light reaches a predetermined level.

6. The area light of claim 1, further including a manually operated switch mounted on the front of the switchplate or outlet plate and associated wiring and modifications to the light emitting diode driver circuit are provided to allow a user to turn off the light emitting diode when desired.

7. The area light of claim 1, further including both an ambient light sensing component and a manually operated switch mounted on the front of the switchplate or outlet plate and associated wiring and modifications to the light emitting diode driver circuit are provided to turn off the light emitting diode when the ambient light reaches a predetermined level and to allow a user to turn off the light emitting diode when desired.

8. The area light of claim 1 wherein said semi-conical housing has a downward facing opening through which light from said light emitting diode passes.

9. The area light of claim 1 wherein said light emitting diode driver circuit drives said light emitting diode below a rated output of said light emitting diode.

10. The area light of claim 1 wherein said light emitting diode includes a light emitting portion and wherein said light emitting portion protrudes less than 5 mm from said switchplate.

11. The area light of claim 1 wherein said LED driver circuit is sufficiently thin to fit between a body of an existing switch or outlet and a side of an existing electrical box.

12. The area light of claim 1 wherein said switchplate is configured to fit on a standard switch or plug.

13. The area light of claim 1 wherein said switchplate is configured to work with a 2-way single pole, single throw switch, without modification to the 2-way SPST switch.

14. The area light of claim 1 wherein said switchplate is configured to work with a 3-way single pole, double throw switch, without modification to the 3-way SPDT switch.

15. The area light of claim 1 wherein said switchplate is configured to work with a 4-way double pole, double throw switch with cross-connect, without modification to the 4-way DPDT switch.

16. The area light of claim 1 wherein said LED driver circuit is connected across traveler wires of a plurality switches.

17. The area light of claim 1 wherein said switchplate, LED, and LED driver circuit are configured to be mounted and installed without the removal an existing electrical box upon which the switchplate is installed.

* * * * *